United States Patent
Kim et al.

(10) Patent No.: US 9,310,271 B2
(45) Date of Patent: Apr. 12, 2016

(54) SYSTEM AND METHOD FOR MEASURING A LEAKAGE AREA FOR CONSTRUCTING A SMOKE-VENTILATION APPARATUS

(75) Inventors: Nam-Il Kim, Seoul (KR); Min-Jung Lee, Seoul (KR); Seung-Il Park, Daegu (KR)

(73) Assignee: Chung-Ang University Industry-Academy Cooperation Foundation, Seoul (KR)

(*) Notice: Subject to any disclaimer, the term of this patent is extended or adjusted under 35 U.S.C. 154(b) by 561 days.

(21) Appl. No.: 13/698,217

(22) PCT Filed: Nov. 14, 2011

(86) PCT No.: PCT/KR2011/008667
§ 371 (c)(1),
(2), (4) Date: Nov. 15, 2012

(87) PCT Pub. No.: WO2012/067390
PCT Pub. Date: May 24, 2012

(65) Prior Publication Data
US 2013/0047706 A1 Feb. 28, 2013

(30) Foreign Application Priority Data

Nov. 17, 2010 (KR) .................. 10-2010-0114573

(51) Int. Cl.
G01M 3/04 (2006.01)
G01M 3/32 (2006.01)
(Continued)

(52) U.S. Cl.
CPC .............. *G01M 3/3209* (2013.01); *G01F 1/34* (2013.01); *G01F 1/36* (2013.01); *G01F 1/44* (2013.01); *G01F 1/46* (2013.01); *G01M 3/3263* (2013.01); *F24F 2011/0097* (2013.01)

(58) Field of Classification Search
CPC ............ G01M 3/3209; G01M 3/3263; G01M 3/3236; G01M 3/3272; G01M 3/329; G01F 1/44; G01F 1/46; G01F 1/34; G01F 1/36; F24F 2011/0097
USPC .................................................. 73/49.2, 49.3
See application file for complete search history.

(56) References Cited

U.S. PATENT DOCUMENTS

| 4,510,791 | A | * | 4/1985 | Yuill | ................... | G01M 3/3236 |
| | | | | | | 73/40 |
| 5,081,864 | A | * | 1/1992 | Zaim | .............................. | 73/49.2 |
| 5,128,881 | A | * | 7/1992 | Saum | ..................... | A62C 37/50 |
| | | | | | | 700/282 |
| 2007/0169543 | A1 | * | 7/2007 | Fazekas | ........................ | 73/49.2 |

(Continued)

FOREIGN PATENT DOCUMENTS

KR 10-2009-0081942 A 7/2009

*Primary Examiner* — John Fitzgerald
*Assistant Examiner* — Truong Phan
(74) *Attorney, Agent, or Firm* — Mintz Levin Cohn Ferris Glovsky and Popeo, P.C.; Kongsik Kim; Jonathon Western

(57) ABSTRACT

Disclosed are a method and system for measuring leakage area for construction of smoke control equipment. The invention provides a system for measuring a leakage area of a test room that can include: a chamber positioned in the test room and storing air compressed by a compressor; one or more pressure sensors configured to measure a pressure change of the test room when the compressed air in the chamber is discharged instantaneously; and a gauging means configured to measure an effective leakage area in the test room by using a pressure change value of the test room detected by the one or more pressure sensors. Embodiments of the invention can enable an accurate measurement of leakage area at low cost.

8 Claims, 9 Drawing Sheets

(51) Int. Cl.
*G01F 1/34* (2006.01)
*G01F 1/36* (2006.01)
*G01F 1/44* (2006.01)
*G01F 1/46* (2006.01)
*F24F 11/00* (2006.01)

(56) References Cited

U.S. PATENT DOCUMENTS

2008/0087445 A1 4/2008 Wagner
2010/0263882 A1 10/2010 Bodemann

* cited by examiner (a)

(b)

SYSTEM AND METHOD FOR MEASURING A LEAKAGE AREA FOR CONSTRUCTING A SMOKE-VENTILATION APPARATUS

CROSS-REFERENCES TO RELATED APPLICATIONS

This application is a U.S. national phase application, pursuant to 35 U.S.C. §371, of PCT/KR2011/008667, filed Nov. 14, 2011, designating the United States, which claims priority to Korean Application No. 10-2010-0114573, filed Nov. 17, 2010. The entire contents of the aforementioned patent applications are incorporated herein by this reference.

TECHNICAL FIELD

The present invention relates to a method and system for measuring leakage area for construction of smoke control equipment, more particularly to a method and system for estimating leakage area capable of accurately measuring the leakage flow rate of a smoke control zone.

BACKGROUND ART

When a fire occurs in a residential apartment building or skyscraper, etc., the combustion of indoor furniture, finishing material, and the like generally creates large amounts of toxic gases. Such toxic gases are a cause of many casualties and also pose large difficulties in firefighting and lifesaving efforts.

In general, a high-rise residential building that does not have a direct staircase has a smoke control zone, composed of a special escape staircase located in front of the inner entrance and an ancillary space of the special escape staircase.

Smoke control equipment may be provided to increase air pressure in the smoke control zone when a fire occurs in a residential space, so that the smoke created during the fire may not enter the smoke control zone where an emergency staircase is located.

The smoke control equipment may maintain a higher air pressure in the smoke control zone than the air pressure in the residential space where a fire has occurred, thereby preventing the smoke from entering the escape staircase. Thus, the smoke control equipment may prevent smoke from spreading to the whole building, prevent the people evacuating the building from suffocating on the smoke, and secure the escape staircase to allow rapid evacuation in the event of a fire.

Fire prevention code requires that, when a fire occurs, a smoke control zone must maintain an air pressure that is greater by an air pressure difference of 50 pascals (or 5.1 mm $H_2O$) than the air pressure of the residential space, by drawing in air from the outside.

In order to maintain the pressure difference between the smoke control zone and the residential space, a fan for supplying air to the smoke control zone may be installed on the roof or in the basement. When a fire is detected by a fire detector or a smoke detector, the fan may operate automatically to supply outside air to the smoke control zone on each floor of the building and maintain the pressure difference of 50 pascals between the smoke control zone and the residential space. For this purpose, a damper may be installed, which remains closed at normal times but is opened automatically in the event of a fire, to supply outside air to the smoke control zone.

In order to maintain the pressure difference required for the smoke control equipment, it is necessary to accurately measure the leakage area of the smoke control zone.

Although fire prevention code defines leakage areas for entrance doors, windows, and elevators, the exact leakage areas cannot be found in this manner.

In the related art, the blower door test was mainly used for measuring the leakage area of a smoke control zone.

FIG. 1 illustrates a blower door test method according to the related art.

As illustrated in FIG. 1, a measuring apparatus 102 may be installed to blow air into a test room 100 in order to conduct a blower door test. Here, the measuring apparatus 102 can be installed on the door of the test room in an airtight state.

Here, the measuring apparatus 102 can include a blower fan 110 connected to a speed controller 114, and the airflow created by the rotation of the blower fan 110 may pass through a mesh 114, a Venturi tube 116, and a Pitot tube 118 and into the test room 100.

A micro manometer 120 may be connected to the Pitot tube 118, and a pressure sensor 122 for measuring the internal pressure may be installed in the test room 100. The blower test may measure the leakage area by calculating the change in pressure resulting from the air blown inside.

The blower door test as described above may entail the difficulty of having to maintain airtightness between the door and the measuring apparatus when installing the measuring apparatus. The degree of airtightness may lead to errors in the measurement data.

Moreover, since the system must maintain airtightness for the door, the size of the door may be increased, but as the size of the measurement zone is increased, it may become more difficult to maintain airtightness, and the size of the fan may also have to be increased.

DISCLOSURE

Technical Problem

An aspect of the present invention, aimed at resolving the above problems in the related art, is to propose a method and system for measuring leakage area for construction of smoke control equipment, which enable a convenient manner of measuring leakage area while ensuring accuracy.

Technical Solution

In order to achieve the objective above, an aspect of the invention provides a system for measuring a leakage area of a test room that includes: a chamber positioned in the test room and storing air compressed by a compressor; one or more pressure sensors configured to measure a pressure change of the test room when the compressed air in the chamber is discharged instantaneously; and a gauging means configured to measure an effective leakage area in the test room by using a pressure change value of the test room detected by the one or more pressure sensors.

The gauging means can measure a first effective leakage area by integrating a pressure change of the test room over an entire duration of pressure change of the test room resulting from the discharge of the compressed air of the chamber.

The gauging means can measure an actual effective leakage area (a second effective leakage area) of the test room by using a predefined correlation formula and the first effective leakage area.

The correlation formula can be:

$$ELA_s = aELA_{int} + b,$$

where $ELA_{int}$ is the first effective leakage area, $ELA_s$ is the second effective leakage area, and a and b are constants.

The correlation formula can be determined by a relationship between the first effective leakage area and an effective leakage area measured by a steady method.

A pressure sensor can be further included, configured to measure a pressure change of the chamber, where the gauging means can measure a first effective leakage area by monitoring a pressure change of the test room according to time when the pressure change in the chamber is stopped.

The gauging means can measure an actual effective leakage area (a second effective leakage area) of the test room by using the first effective leakage area and a correlation formula shown below:

$$ELA_s = aELA_{diff} + b,$$

where $ELA_{diff}$ is the first effective leakage area, $ELA_s$ is the second effective leakage area, and a and b are constants.

The gauging means can measure the first effective leakage area through smoothing processes performed a predefined number of times or more.

A solenoid valve can be mounted on the chamber, the solenoid valve configured to open in response to a trigger signal.

Another aspect of the invention provides a method for measuring a leakage area of a test room that includes: positioning a chamber in the test room; compressing air in the chamber by using a compressor; opening a valve to instantaneously discharge the compressed air in the chamber; measuring a pressures change of the test room resulting from the discharge of the compressed air by using a pressure sensor; and measuring an effective leakage area in the test room by using the detected pressure change value of the test room.

Yet another aspect of the invention provides a recorded medium readable by a digital processing device, the recorded medium tangibly embodying a program of instructions executable by the digital processing device to perform a method comprising: receiving a pressure change value resulting from instantaneously discharging compressed air in a chamber positioned in the test room; and measuring an effective leakage area in the test room by using the pressure change value, where the measuring of the effective leakage area comprises measuring a first effective leakage area by integrating a pressure change of the test room over an entire duration of pressure change of the test room resulting from the discharge of the compressed air of the chamber.

Advantageous Effects

According to certain embodiments of the invention, a chamber containing compressed air may be positioned in the test room for measuring the leakage area, thereby providing a shortened measurement time and enabling convenient installation of equipment.

MODE FOR INVENTION

Figure 1:
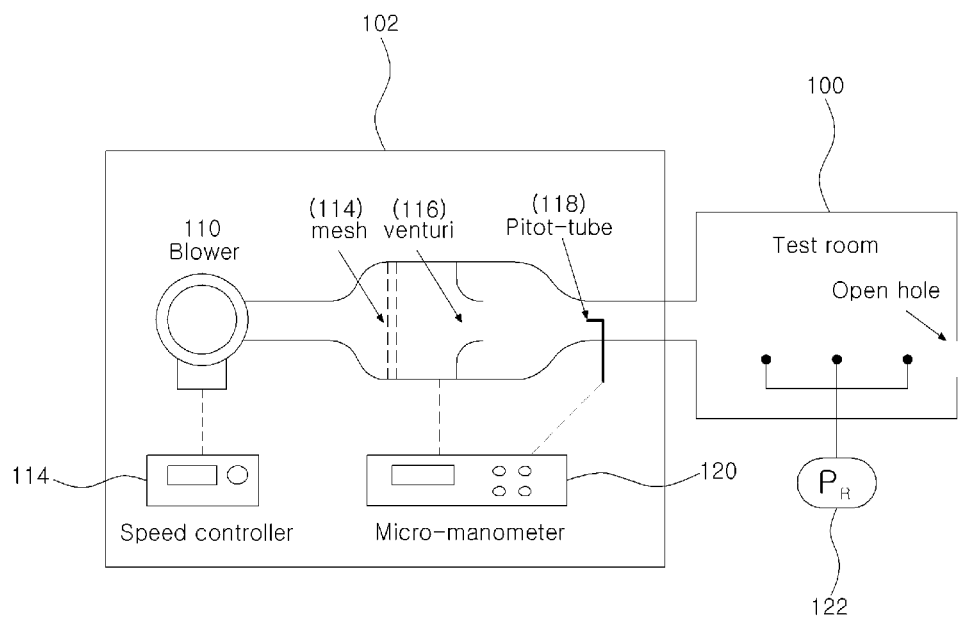
FIG. 1 illustrates a blower door test method according to the related art.

Certain preferred embodiments of the invention will be described below in more detail with reference to the accompanying drawings. For easier understanding overall, like elements will be represented by like reference numerals, regardless of the figure number.

Figure 2:
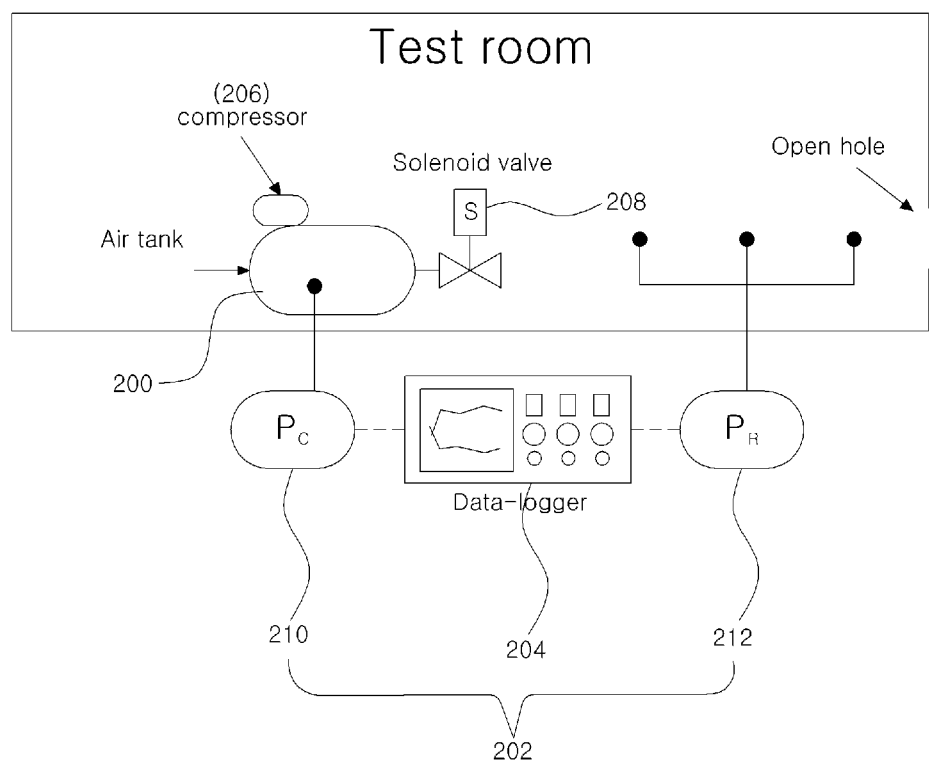
FIG. 2 is a block diagram of a system for measuring leakage area according to an exemplary embodiment of the invention.

FIG. 2 is a block diagram of a system for measuring leakage area according to an exemplary embodiment of the invention.

As illustrated in FIG. 2, a system for measuring leakage area according to this embodiment can include a chamber 200, one or more pressure sensors 202, and a gauging means 204.

A compressor 206 may be mounted on the chamber 200, and the compressor 206 may compress the air inside the chamber 200. Also, a solenoid valve 208 may be mounted at one side of the chamber 200.

According to a preferred embodiment of the invention, the chamber 200 may be arranged inside the test room (smoke control zone) and may instantaneously discharge the compressed air into the test room when the solenoid valve 208 is opened.

According to this embodiment, the pressure sensors 202 can include a first pressure sensor 210 for measuring the pressure inside the chamber 200 and one or more second pressure sensors 212 for measuring the pressure in the test room resulting from the discharge of the compressed air.

The first pressure sensor 210 and the second pressure sensor 212 may be connected to the gauging means 204. When the chamber 200 is opened, the gauging means 204 may monitor the pressure change in the chamber 200 and the pressure change in the test room according to time, by way of the first pressure sensor 210 and second pressure sensors 212, to thereby measure the leakage area in the test room.

Whereas the conventional blower test can be defined as a steady method, in that it involves measuring the leakage area by blowing air continuously, the present invention can be defined as a transient method, in that it involves measuring the leakage area of the test room by discharging compressed air instantaneously.

Compared to the blower test, this embodiment entails convenient installation, with just the air-discharging device, i.e. the chamber 200, arranged in the test room.

The gauging means 204 may accurately measure the leakage area by using a correlation between a steady method and a transient method defined by experimentation as described below.

The first leakage area calculated by a transient method may be substituted into a formula representing correlation with a steady method, to estimate the actual leakage area (second leakage area) of the test room.

Below, a test for deriving the correlation between the first leakage area and the second leakage area will be described in more detail.

(1) Preparation of the Test Room and the Chamber

Figure 3:
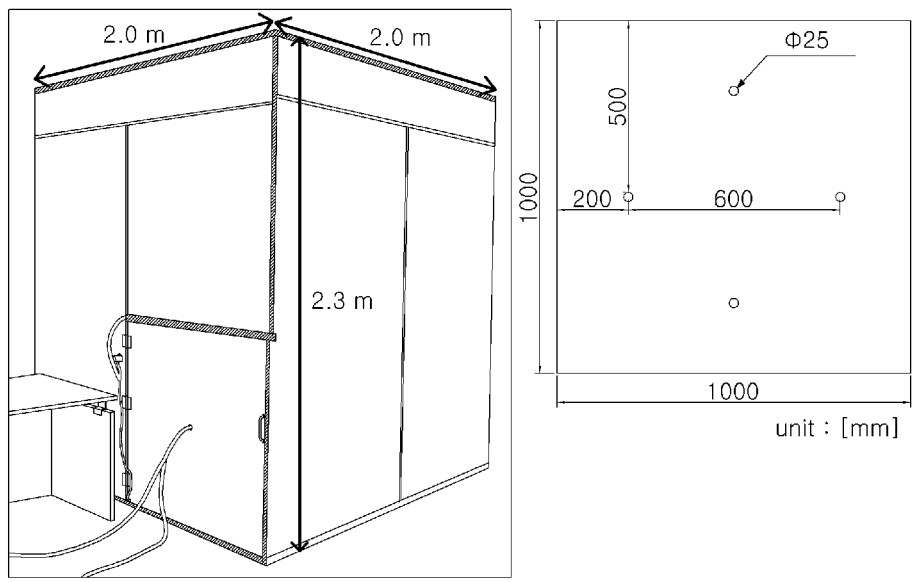
FIG. 3 illustrates a test room for measuring leakage area according to an embodiment of the invention.

As illustrated in FIG. 3, an airtight test room was prepared, which was 2 m long, 2 m across, and 2.3 m high.

The chamber 200 had a volume of 10 liters, and a small compressor 206 was mounted on one side of the chamber 200.

On the orifice of the chamber 200, a solenoid valve (SMC, VPW2165) was installed, which was configured to operate in response to a trigger signal.

Here, the overall volume, including the chamber 200, compressor 206, and solenoid valve 208, was no more than 15 liters, and the mass was no more than 10 kg.

Here, since the volume ratio between the test room and the measurement device ($V_C/V_R$) was 0.001, the pressure change of the test room was expected to be about 0.1% of the initial chamber pressure; for example, if the chamber pressure were 5 bars, then the pressure of the test room after discharging the compressed air would be expected to be 500 Pa.

The second pressure sensors 212 used for measuring the pressure of the test room had a measurement range of 0 to 195 Pa (FCO12, Fumes).

(2) The Main Experiment

In measuring the leakage area using a transient method, the experiments were performed repeatedly using a test room with an opening having an area of 9.8 cm$^2$.

The initial pressure of the chamber 200 was set to 5 bars.

Figure 4:
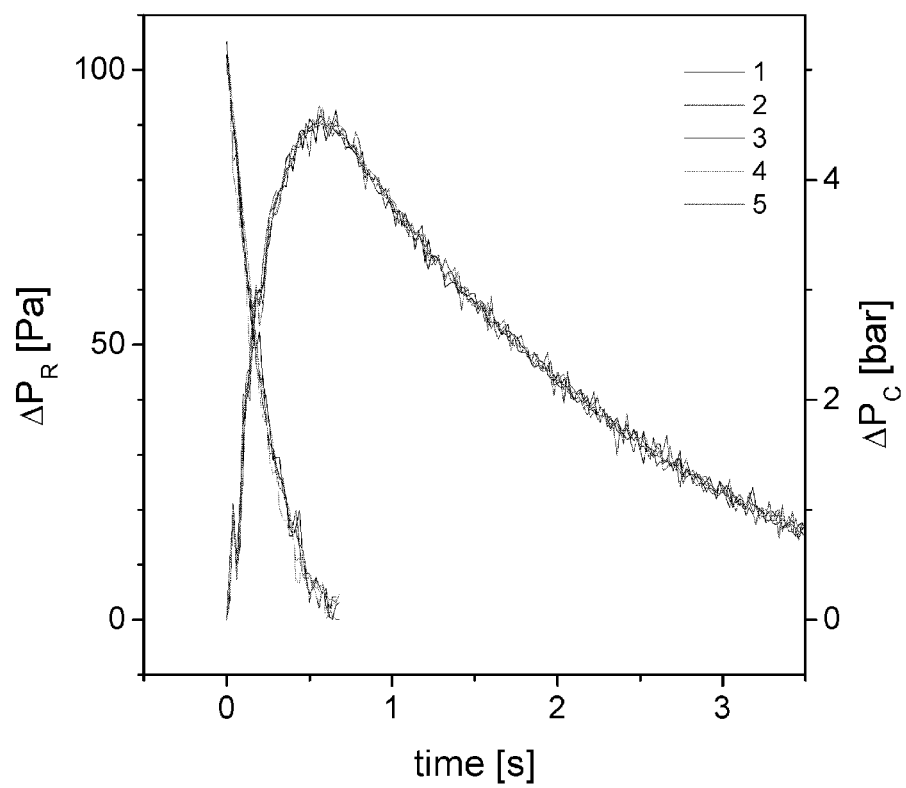
FIG. 4 represents pressure changes in the chamber and test room with an initial pressure of 5 bars.

FIG. 4 represents the results of the repetitions of experiments performed for the chamber 200 and the test room under the conditions listed above ($\Delta P_{C,0}$=5 bars, $A_{open}$=9.8 cm$^2$).

As illustrated in FIG. 4, the pressure in the test room is increased quickly by the instantaneous discharge of the compressed air in the chamber 200 and is decreased slowly by leakage. It could be observed that the peak pressure in the test room was 90 Pa.

On the other hand, the pressure in the chamber 200 was decreased rapidly, the duration of the decrease in pressure (time taken for the discharge of the compressed air) being 0.5 seconds.

Figure 5:
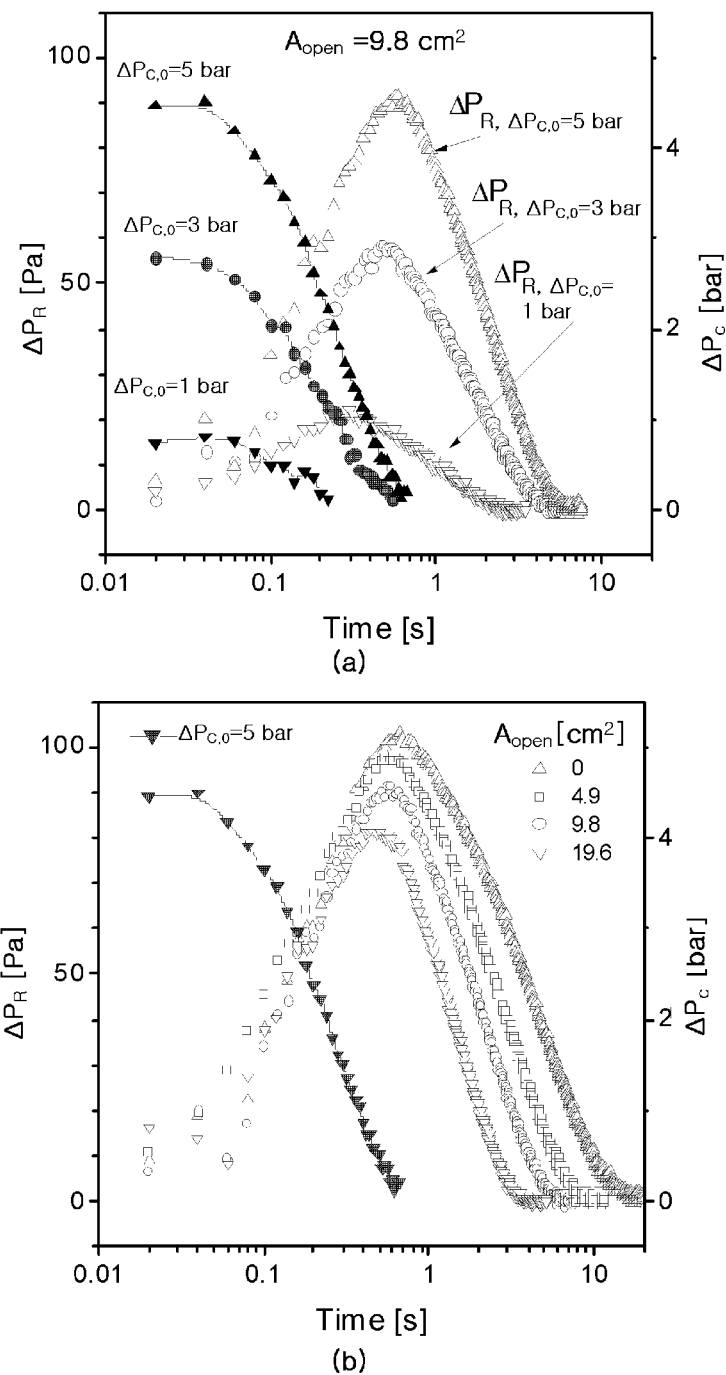
FIG. 5a represents chamber and test room pressure changes for a variety of initial pressure values.
FIG. 5b represents pressure changes in the test room depending on the area of the opening.

FIG. 5a represents pressure changes in the chamber and the test room for a variety of initial pressure values. As illustrated in FIG. 5a, when the initial pressure of the chamber is increased, the peak pressure in the test room and the duration of the decrease in pressure are also increased. However, even though the initial pressures may differ, the pressure changes in the test room during the discharge of the compressed air may show similar trends.

FIG. 5b represents pressure changes in the test room depending on the area of the opening. In FIG. 5b, the initial pressure of the chamber is 5 bars.

In FIG. 5b, the area of the opening can be adjusted by increasing the area of one opening or by increasing the number of openings having the same area. The experiments were performed for cases in which the areas of the opening were 0, 4.9, 9.8, and 19.6 cm$^2$, and it was observed that, while an increase in the area of the opening reduces the pressure peak of the test room and the pressure change duration, the pressure change of the chamber remains unaffected.

In the present experiments, the following mass continuity equation was used for a test room containing a pressure chamber 200 in order to investigate the pressure change described above.

$$\frac{dm_R}{dt} + \frac{dm_C}{dt} = -\rho_R Q_{leak} \quad \text{[Equation 1]}$$

Here, $m_R$ is the mass of the air present in the test room, $m_C$ is the mass of the air in the chamber, and $Q_{leak}$ is the leakage area.

By using the ideal gas law, Equation 1 above can be expressed as follows:

$$\frac{1}{\rho_R} + \frac{V_R}{R}\left[\frac{d}{dt}\left(\frac{P_R}{T_R}\right) + \frac{V_C}{V_R}\frac{d}{dt}\left(\frac{P_C}{T_C}\right)\right] = -Q_{leak} \quad \text{[Equation 2]}$$

In Equation 2, in order to measure $Q_{leak}$, it is required to measure the pressure change in the test room ($P_R$) and the pressure change in the chamber ($P_C$). Also, it is required to measure the temperature change in the test room ($T_R$) and the temperature change in the chamber ($T_C$).

As the temperature change in the test room is not expected to be great, the first term of Equation 2 can be simplified as follows:

$$\frac{d}{dt}\left(\frac{P_R}{T_R}\right) = \frac{d}{dt}\left(\frac{P_0 + \Delta P_R}{T_0 + \Delta T_R}\right) \approx \frac{1}{T_0}\frac{d\Delta P_R}{dt} \quad \text{[Equation 3]}$$

Here, $T_0$ is the initial temperature of the test room, $\Delta T_R$ is the temperature change value in the test room, $P_0$ is the initial pressure (i.e. atmospheric pressure), $\Delta P_R$ is the pressure change value in the test room.

Using a polytropic process, the relationship between the chamber's pressure and chamber can be expressed as follows:

$$\frac{P_C}{T_C} = \left(\frac{P_{C,0}}{T_0}\right)\left(\frac{P_C}{T_{C,0}}\right)^{\frac{1}{n}} = \frac{P_{C,0}^{1-\frac{1}{n}}}{T_0} P_C^{\frac{1}{n}} \quad \text{[Equation 4]}$$

Here, n is within a range of 1 and 1.4 for air $$\left(\frac{C_P}{C_V} \sim 1.4\right),$$

and $P_{C,0}$ is the initial absolute pressure of the chamber.

$$\frac{d}{dt}\left(\frac{P_C}{T_C}\right) = \frac{P_{C,0}^{1-\frac{1}{n}}}{T_0}\frac{dP_C^{\frac{1}{n}}}{dt} = \frac{1}{nT_0}\left(\frac{P_{C,0}}{P_C}\right)^{1-\frac{1}{n}}\frac{dP_C}{dt} \quad \text{[Equation 5]}$$

By substituting Equations 2 and 4 into Equation 1, the following equation can be derived.

$$Q_{leak} = \frac{-V_R}{P_0}\left[\frac{d\Delta P_R}{dt} + \frac{V_C}{V_R}\frac{1}{n}\left(\frac{P_0 + \Delta P_{C,0}}{P_0 + \Delta P_C}\right)^{1-\frac{1}{n}}\frac{d\Delta P_C}{dt}\right] \quad \text{[Equation 6]}$$

Here, $\Delta P_C$ is the pressure change value of the chamber, and $\Delta P_{C,0}$ is the initial pressure value of the chamber.

Equation 6 described above shows that the effective leakage area (ELA) can be measured through the pressure change in the test room according to time $$\left(\frac{d\Delta P_R}{dt}\right)$$

and the pressure change of the chamber $$\left(\frac{d\Delta P_C}{dt}\right).$$

If the volume ratio $$\left(\frac{V_C}{V_R}\right)$$

and the exponent constant n are known, then the ELA can be predicted accurately.

However, since Equation 6 is still quite complicated, the present embodiment presents below a simple method for obtaining the ELA.

According to this embodiment, a differential method, for selecting the pressure change of the test room after the pressure change of the chamber is completed, and an integral method, for integrating the pressure of the test room, can be used to obtain the ELA.

1) Differential Method

In the differential method, the pressure change of the test room is selected for the case in which the pressure change of the chamber is 0, and therefore, Equation 6 can be simplified as follows:

$$Q_{leak} \approx \frac{V_R}{P_0}\frac{d\Delta P_R}{dt} \qquad \text{[Equation 7]}$$

When using Equation 7 above, it is required to know the pressure change in the test room according time, and as such, much noise can be involved. Thus, a smoothing process may be performed for the test data. The new data can be algebraically averaged by the following equation:

$$\Delta P_{R,new}(t)=\Delta P_R(t-\Delta t)/4+\Delta P_R(t)/2+\Delta P_R(t+\Delta t)/4 \qquad \text{[Equation 8]}$$

The number of repetitions of the smoothing process can be set in various ways.

Figure 6:
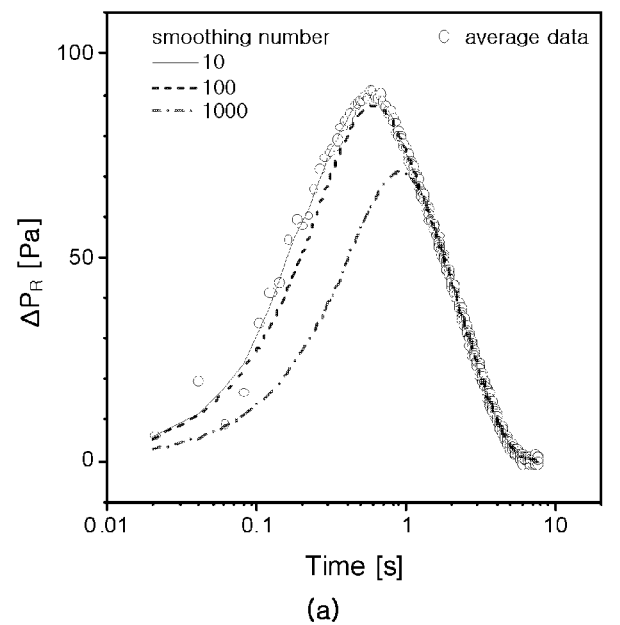
FIG. 6 represents the data after a smoothing process for a differential method according to an embodiment of the invention.
Figure 6:
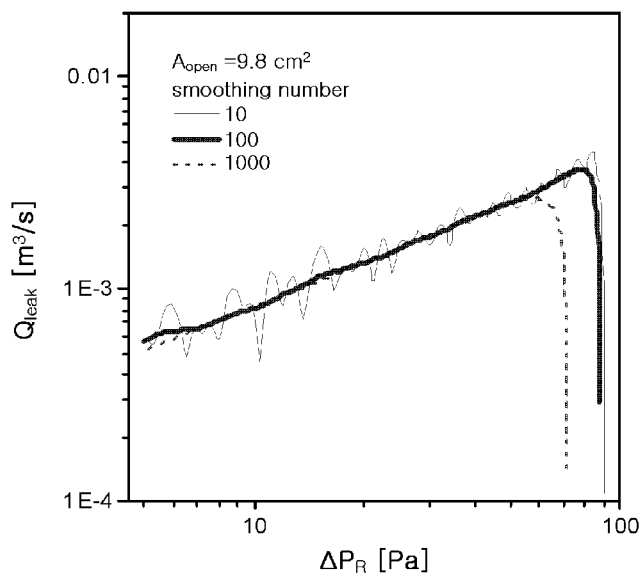

The results of a smoothing process are illustrated in FIG. 6a. As illustrated in FIG. 6a, if the number of smoothing processes is 10 or less, the smoothened data approximates the test data, and as it increases from 100 to 1000, the initial value is delayed considerably. However, there is no impact on the data after the peak.

Using the smoothened data and Equation 7, the flow rate speed of the leakage may be calculated. FIG. 6b illustrates the data for cases in which the area of the opening is 9.8 cm².

With smaller numbers of smoothing processes, the estimated flow rate speeds show considerable oscillation, whereas with increased numbers of smoothing processes, the oscillations in the flow rate speeds are reduced.

Figure 7:
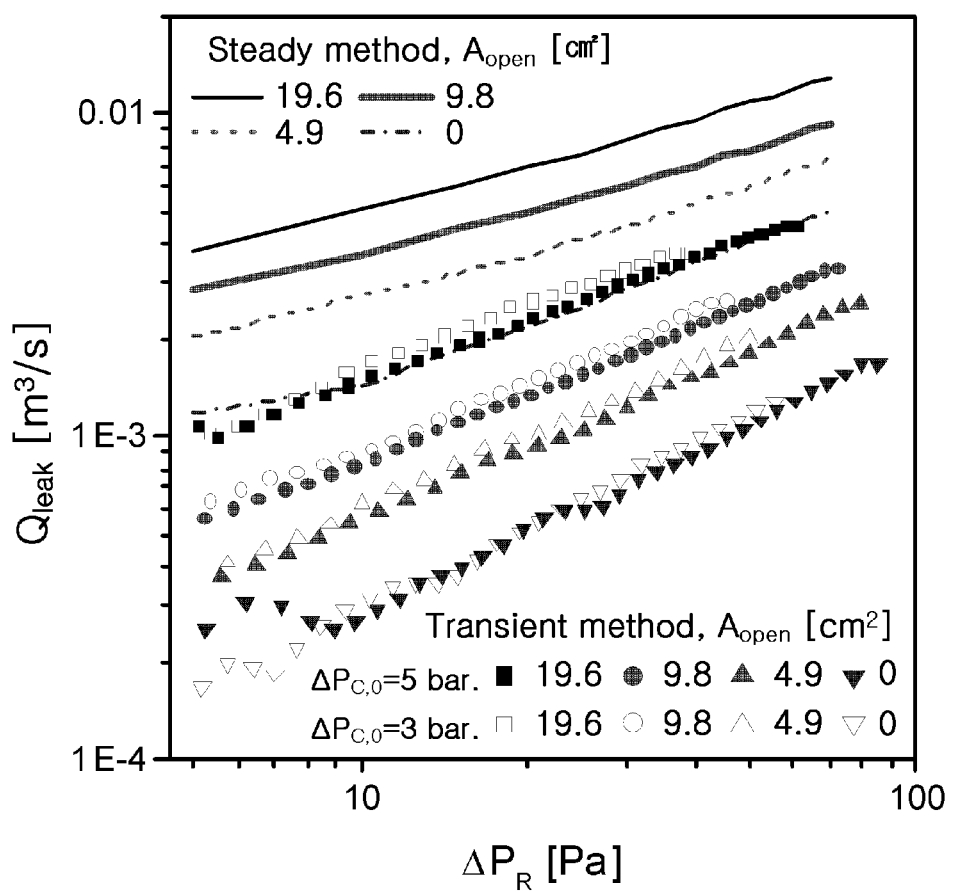
FIG. 7 is a graph comparing leakage flow rate speeds between a method according to the related art and a method according to an embodiment of the invention.

FIG. 7 is a graph comparing leakage flow rate speeds between a method according to the related art and a method according to an embodiment of the invention.

As illustrated in FIG. 7, the steady method and the differential method (transient method) show similar trends for leakage flow rate speeds in the test room according to pressure changes, but it can be observed that the leakage flow rate speeds for the steady method have greater values.

To compensate for this difference, that is, to estimate the ELA accurately, the following unsteady Bernoulli equation can be used:

$$\Delta P_R = \rho_R \int_{s1}^{s2} \frac{\partial U}{\partial t} ds + \frac{1}{2}\rho_R U_2^2 \qquad \text{[Equation 9]}$$

However, Equation 9 entails complicated calculation and uncertainty.

Thus, in calculating the pressure change in the test room, a steady Bernoulli equation can be used.

Figure 8:
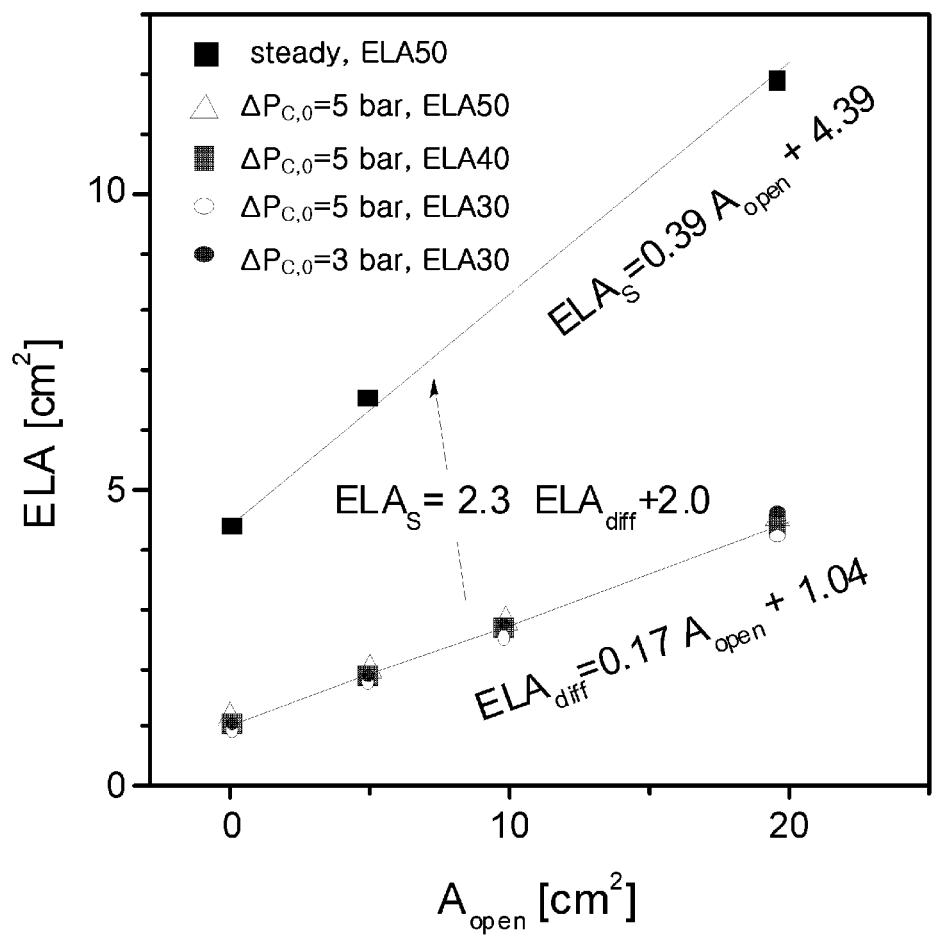
FIG. 8 represents a comparison of ELA values between a steady method and a differential method.

FIG. 8 represents a comparison of ELA values between a steady method and a differential method.

FIG. 8 shows ELA values for the cases in which the $\Delta P_{C,0}$ is 5 bars and $\Delta P_R$ is 30, 40, and 50 Pa, and in which $\Delta P_{C,0}$ is 3 bars and $\Delta P_R$ is 30 Pa.

Referring to FIG. 8, there are large differences in the ELA values between the steady method and the differential method, where the ELA obtained from the differential method show greater linearity compared to those obtained by the steady method.

Using the results of FIG. 8, the following correlation can be derived between $ELA_s$ obtained by the steady method and $ELA_{diff}$ obtained by the differential method:

$$ELA_s = 2.3 ELA_{diff} + 2.0 \qquad \text{[Equation 10]}$$

2) Integral Method

The integral method according to this invention makes it possible to measure the leakage area using a very simple method.

In the integral method, Equation 1 combined with the steady Bernoulli equation is integrated over time to be expressed as follows:

$$\int_0^{\Delta t}\frac{dm_R}{dt}dt + \int_0^{\Delta t}\frac{dm_C}{dt}dt = -A_{eff}\int_0^{\Delta t}\sqrt{2\rho_R \Delta P_R}\,dt \qquad \text{[Equation 11]}$$

Here, $A_{eff}$ represents effective leakage area.

Since the mass within the test room remains unchanged, Equation 11 can be simplified as follows:

$$m_{C,\Delta t} - m_{C,0} = -A_{eff}\int_0^{\Delta t}\sqrt{2\rho_R \Delta P_R}\,dt \qquad \text{[Equation 12]}$$

The term on the right can be numerically integrated over the entire duration of the pressure change, and the terms on the right can be subjected to a polytropic process, to be expressed as follows:

$$m_{C,0} - m_{C,\Delta t} = \rho_R V_C \left(\frac{P_{C,0}}{P_0}\right)\left[1 - \left(\frac{P_{C,0}}{P_0}\right)^{-\frac{1}{n}}\right] \qquad \text{[Equation 13]}$$

Figure 9:
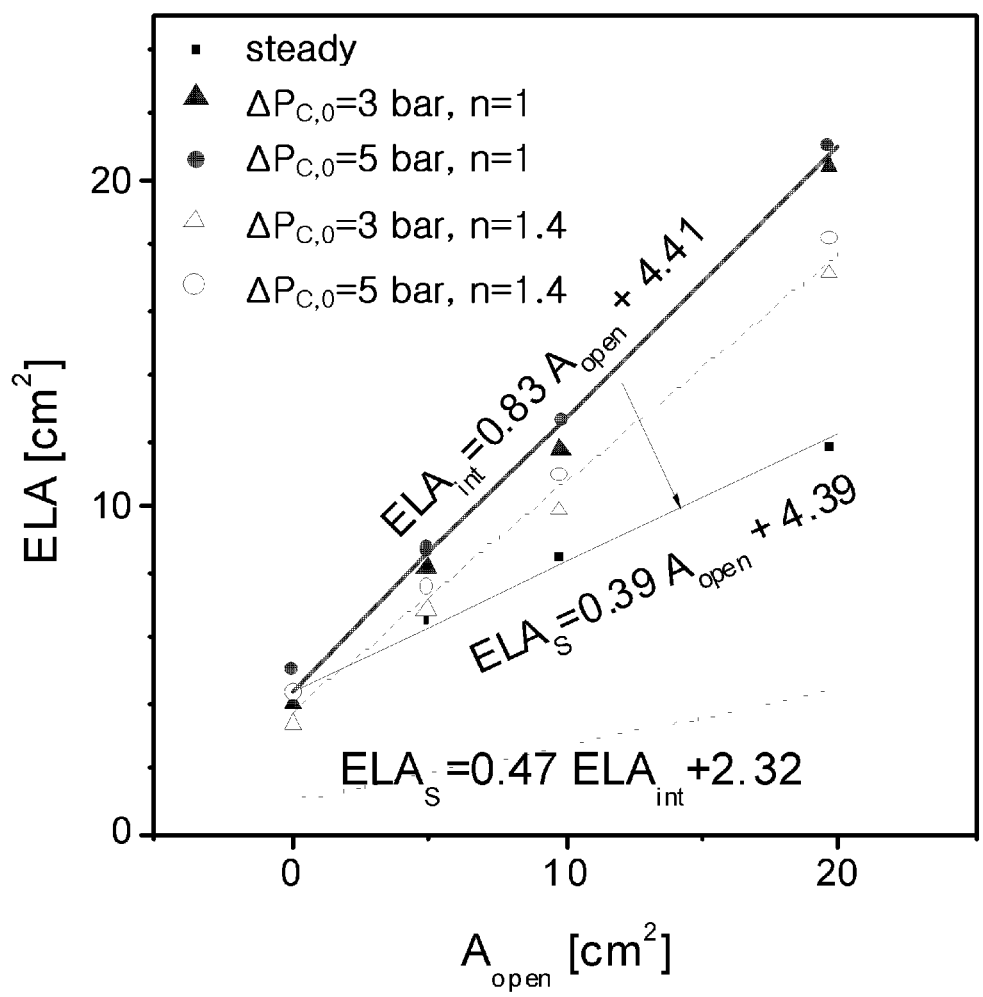
FIG. 9 represents ELA values obtained by using an integral method according to an embodiment of the invention.

FIG. 9 represents ELA values obtained by using an integral method according to an embodiment of the invention.

With the integral method according to the present invention, a smoothening process is not required as for the differential method, and as such, the ELA of the test room can be obtained easily.

FIG. 9 compares the cases in which n is 1 (there is no temperature change) and n=1.4; the differences in the ELA values obtained by the temperature change assumptions can be explained by the temperature change resulting from the sudden expansion of air.

If a post-correlation can be defined between the steady method and the transient method, then Equations 12 and 13 can be simplified as follows, when it is assumed n=1:

$$A_{\textit{eff}} = \frac{V_C \sqrt{\rho_R/2}}{\int_0^{\Delta t} \Delta P_R dt} \left( \frac{P_{C,0}}{P_0} - 1 \right) \qquad \text{[Equation 14]}$$

Also, the correlation between the steady method and the integral method can be expressed as follows:

$$\text{ELA}_s = 0.47 \text{ELA}_{int} + 2.32 \qquad \text{[Equation 15]}$$

With the integral method according to this invention, it is not necessary to monitor the chamber pressure, and it is possible to estimate the ELA only by measuring the pressure of the test room. Thus, the test procedures and apparatus may be simplified.

According to the present invention, the leakage area may be measured by positioning the measuring apparatus within the test room, for more convenient measurement compared to existing steady methods. Moreover, if an integral method is used as above, there is the advantage of reduced complexity in the corrections.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

INDUSTRIAL APPLICABILITY

The embodiments of the present invention described in the above are for illustrative purposes only. It is to be appreciated that those of ordinary skill in the art can modify, alter, and make additions to the embodiments without departing from the spirit and scope of the present invention, and that such modification, alterations, and additions are encompassed in the appended claims.

The invention claimed is:

1. A system for estimating a leakage area of a test room, the system comprising:
   a chamber positioned in the test room and storing air compressed by a compressor;
   one or more pressure sensors configured to measure a pressure change of the test room when the compressed air in the chamber is discharged instantaneously; and
   a gauging means configured to estimate a leakage area in the test room by using a pressure change value of the test room detected by the one or more pressure sensors, wherein
   the gauging means is further configured to estimate a first leakage area by integrating a pressure change of the test room over an entire duration of pressure change of the test room resulting from the discharge of the compressed air of the chamber, and
   the gauging means is further configured to estimate a second leakage area of the test room by using a predefined correlation formula and the first leakage area.

2. The system of claim 1, wherein the chamber has a solenoid valve mounted thereon, the solenoid valve configured to open in response to a trigger signal for instantaneous discharging of the compressed air into the test room.

3. The system of claim 1, wherein the correlation formula is:

$$\text{ELA}_s = a\text{ELA}_{int} + b,$$

where $\text{ELA}_{int}$ is the first leakage area, $\text{ELA}_s$ is the second leakage area, and a and b are constants.

4. The system of claim 3, wherein the correlation formula is determined by a relationship between the first leakage area and a leakage area measured by a steady method.

5. A system for estimating a leakage area of a test room, the system comprising:
   a chamber positioned in the test room and storing air compressed by a compressor;
   one or more pressure sensors configured to measure a pressure change of the test room when the compressed air in the chamber is discharged instantaneously;
   a gauging means configured to estimate a leakage area in the test room by using a pressure change value of the test room detected by the one or more pressure sensors; and
   a pressure sensor configured to measure a pressure change of the chamber, wherein
   the gauging means is further configured to estimate a first leakage area by monitoring a pressure change of the test room according to time when the pressure change in the chamber is stopped, and
   the gauging means is further configured to estimate a second leakage area of the test room by using the first leakage area and a correlation formula shown below:

$$\text{ELA}_s = a\text{ELA}_{\textit{diff}} + b$$

where $\text{ELA}_{\textit{diff}}$ is the first leakage area, $\text{ELA}_s$ is the second leakage area, and a and b are constants.

6. The system of claim 5, wherein the gauging means is further configured to estimate the first leakage area through smoothing processes performed a predefined number of times or more.

7. A method for estimating a leakage area of a test room, the method comprising:
   positioning a chamber in the test room;
   compressing air in the chamber by using a compressor;
   opening a valve to instantaneously discharge the compressed air in the chamber;
   measuring a pressure change of the test room resulting from the discharge of the compressed air by using a pressure sensor; and
   estimating a leakage area in the test room by using the detected pressure change value of the test room, wherein
   the estimating of the leakage area comprises estimating a first leakage area by integrating a pressure change of the test room over an entire duration of pressure change of the test room resulting from the discharge of the compressed air of the chamber and estimating a second leakage area of the test room by using a predefined correlation formula and the first leakage area, and the predefined correlation formula is:

$$ELA_s = aELA_{int} + b,$$

where $ELA_{int}$ is first leakage area, $ELA_s$ is the second leakage area, and a and b are constants.

8. A non-transitory recorded medium readable by a digital processing device, the recorded medium tangibly embodying a program of instructions executable by the digital processing device to perform a method comprising:

receiving a pressure change value resulting from instantaneously discharging compressed air in a chamber positioned in the test room; and estimating a leakage area in the test room by using the pressure change value, wherein the estimating of the leakage area comprises measuring a first leakage area by integrating a pressure change of the test room over an entire duration of pressure change of the test room resulting from the discharge of the compressed air of the chamber and estimating a second leakage area of the test room by using a predefined correlation formula and the first leakage area, and the predefined correlation formula is:

$$ELA_s = aELA_{int} + b,$$

where $ELA_{int}$ is the first leakage area, $ELA_s$ is the second leakage area, and a and b are constants.

\* \* \* \* \*